United States Patent [19]

Brunnenkant

[11] Patent Number: 5,182,944
[45] Date of Patent: Feb. 2, 1993

[54] HELICOPTER ICING SPRAY SYSTEM

[76] Inventor: Siegfried W. Brunnenkant, 20408 Lucrino, New Orleans, La. 70129

[21] Appl. No.: 642,878

[22] Filed: Jan. 18, 1991

[51] Int. Cl.⁵ .......................................... G01M 15/00
[52] U.S. Cl. ................................................... 73/117.1
[58] Field of Search ................ 73/117.1, 118.1, 865.6, 73/865.9, 178 H; 62/244; 239/14.2, 211

[56] References Cited

U.S. PATENT DOCUMENTS

| | | |
|---|---|---|
| 3,908,903 | 9/1975 | Burns, Jr. |
| 3,940,622 | 2/1976 | Stallabrass et al. ............... 250/338.1 |
| 4,054,255 | 10/1977 | Megenheim ...................... 73/178 H |
| 4,131,250 | 12/1978 | Binckley . |
| 4,723,707 | 2/1988 | Xavier . |
| 4,748,817 | 6/1988 | Oura et al. . |
| 4,755,062 | 7/1988 | Meyer . |
| 4,799,390 | 1/1989 | Kimura . |
| 4,833,660 | 5/1989 | Deom . |

*Primary Examiner*—Robert Raevis
*Attorney, Agent, or Firm*—George A. Bode

[57] ABSTRACT

A system for testing the icing build-up of helicopter engines during flight, the system being self-contained on the helicopter and comprising: sources of air and water under pressure connected to a spray rig mounted externally of the aircraft and upstream from its engines air inlets to spray a mixture of air and water toward the engines air inlets. The spray rig has an adjustable outer housing being open at its front and rear for allowing and controlling ambient air flow therethrough and toward the engine air inlet and a plurality of spray nozzles mounted on a distribution tree positioned in the housing and connected to the sources of air and water.

15 Claims, 8 Drawing Sheets

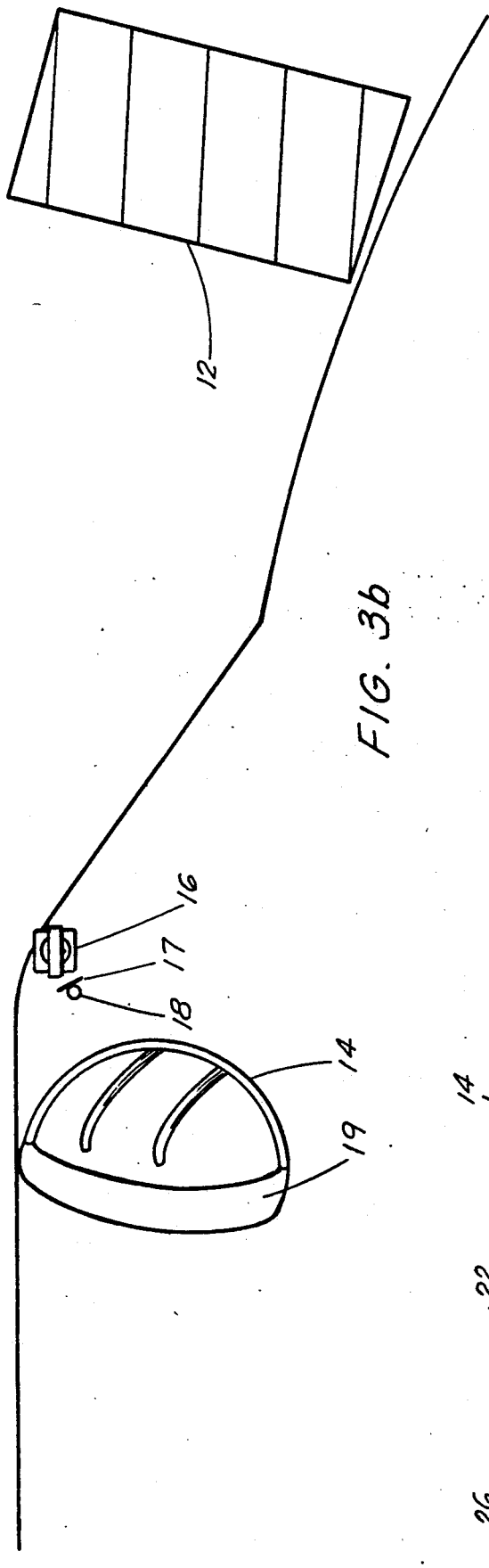
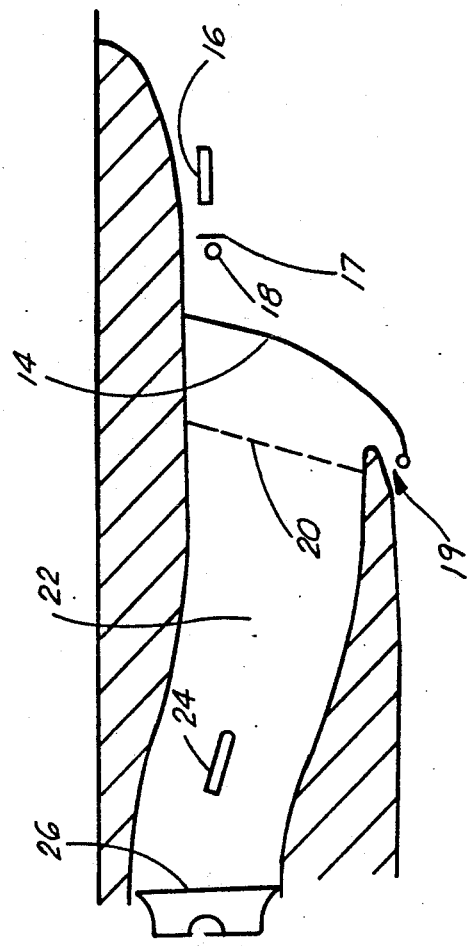
FIG. 3b
FIG. 3d

TABLE 1A - TEST CONDITION FLOWN

| COND. | KIAS | DAT | TIME | LWC | MVD |
|---|---|---|---|---|---|
| 5C | 75 | 16.2 | 30.0 | 1.02 | 21 |
| 9B | 50 | 31 | 22.0 | 1.77 | 42 |
| 5A | 50 | 16.6 | 5.3 | 2.62 | 19 |
|  |  |  | 21.7 | 1.28 | 22 |
| 5B | 100 | 14.7 | 6.4 | 2.13 | 28 |
|  |  |  | 12.4 | 0.71 | 25 |
| 5E | 50 | 16.7 | 5.3 | 1.34 | 58 |
|  |  |  | 21.9 |  |  |
| 5D | 100 | 18.7 | 6.4 | 0.80 | 40 |
|  |  |  | 12.4 | 0.58 | 41 |
| 8A |  | 23.6 | 40.0 | 0.88 | 43 |
| 9A |  | 32.0 | 30.0 | 2.10 |  |
| 7A | 50 | -4 | 5.3 | 2.45 | 19 |
|  |  |  | 21.9 | 1.08 | 17 |
| 7B | 100 | -2 | 6.4 | 1.74 | 25 |
|  |  |  | 12.4 | 0.71 | 25 |
| 6A | 50 | 10.5 | 27.0 | 1.94 | 26 |
| 6B | 50 | 14 | 21.9 | 1.12 | 25 |
|  |  |  | 5.3 | 1.86 | 25 |
| 6D | 50 | 15 | 21.9 | 0.90 | 29 |
|  |  |  | 5.3 | 2.15 | 21 |

RIG CAPABILITIES

FIG. 9A

TABLE 1B - TEST COND. BY OBJECTIVES

| EFFECT OF | VARIABLE | RUN | CONSTRAINTS |
|---|---|---|---|
| AIRSPEED | 50 KIAS<br>100 KIAS | 5A<br>5B | SMALL DROPLETS<br>AT -17 DEG. F |
|  | 50 KIAS<br>100 KIAS | 5E<br>5D | LARGE DROPLETS<br>AT -17 DEG. F |
| DROPLET SIZE | SMALL<br>LARGE | 8A<br>9A | HOVER<br>17 DEG F |
|  | SMALL<br>LARGE | 5A<br>5E | 50 KIAS AT<br>17 DEG. F |
| TEMP | -4 DEG F<br>17 DEG F<br>31 DEG F | 7A<br>5A<br>9B | SMALL DROPLETS<br>AT 50 KIAS |
| SCREEN SIZE | SMALL | 5A<br>6A-6D | 50 KIAS AT<br>17 DEG F |
| HOLDING | SMALL | 5C | 75 KIAS AT<br>16 DEG F |
|  | LARGE | 9A | GROUND RUN<br>32 DEG F |

RIG CAPABILITIES

FIG. 9B

RAKE PERFORMANCE

# HELICOPTER ICING SPRAY SYSTEM

BACKGROUND OF THE INVENTION

1. Field of the Invention

The present invention relates to a helicopter icing spray system, particularly an airborne icing system that is installed on the test aircraft so that its component parts can be tested under appropriate icing conditions.

2. General Background

The efficient design, instrumentation and testing of air induction systems to demonstrate compliance with the requirements of Appendix C of CFR continues to be one of the challenges of the aerospace industry. Not only must the design be of sufficient flexibility to accommodate the various potential flows and air pressures demanded by the dependent turbine engine, it often must serve as a shield and centrifugal flow separator to channel undesirable foreign objects away from the engine inlet.

Traditionally, most of the work for Appendix C certification has been done using ice tunnels and/or stationary super cooled water droplet generators. A typical ice test, therefore, required long lead times because of ice tunnel scheduling or was dependent on local weather conditions. This often resulted in unacceptable time delays as well as very expensive testing.

U.S. Pat. No. 4,799,390 issued to Kabushiki-Kaisha on the application of C. Kimura teaches a snow-weather test apparatus having a low temperature testing chamber and a water spraying unit with injection nozzles for spraying water with an air jet into a mist, the spraying unit being movably provided in the low temperature testing chamber.

U.S. Pat. No. 4,131,250 issued to E. T. Binckley discloses a helicopter with an external system mounted thereon to spray a freezing point depressant fluid. The freezing point depressant fluid is sprayed onto the main rotor blade to prevent the collection of ice when flying through icing weather.

U.S. Pat. Nos. 4,748,817; No. 4,755,062; No. 3,908,903; No. 4,723,707; and, No. 4,833,660 are other prior art patents in the general field.

In recent years the use of airborne icing systems (AISS) to accomplish testing have also been employed. Normally, these devices are installed in another aircraft and the test aircraft is flown in the spray pattern produced by the AISS. These systems require considerable support, highly trained personnel and often provide only a limited coverage of the test aircraft. The U.S. Army Aviation Engineering Flight Activity (USAA-EFA) publication entitled Helicopter Icing Spray System (HISS) Evaluation and Improvements, April 1986, discusses such systems with respect to helicopters.

SUMMARY OF THE PRESENT INVENTION

Applicant has developed a new AISS system in conjunction with the testing of engine installations in helicopters. The preferred embodiment of the apparatus of the present invention solves the aforementioned problems in a straight forward and simple manner. What is provided is a spray rake, controls and instrumentation. This new system is compact enough to be installed on the test aircraft and overcomes many of the aforementioned problems, while facilitating engine inlet ice protection development and evaluation. Although designed to show engine inlet compliance with the requirement of AFR 29.1093, this device can be used for other airborne or stationary certification work.

BRIEF DESCRIPTION OF THE DRAWING

For a further understanding of the nature and objects of the present invention, reference should be had to the following description taken in conjunction with the accompanying drawing in which like parts are given like reference numerals and, wherein:

FIGS. 3a and 3b are a helicopter inlet application of the system of the preferred embodiment of the present invention;

FIG. 7 is a cross-sectional view of the nozzle feed of the apparatus of the present invention taken along Lines A—A of FIG. 6a;

FIG. 8 is a cross-sectional view of the nozzle feed of the apparatus of the present invention taken along Lines B—B of FIG. 6a;

FIGS. 9A and 9B are tables of the spray rake's capabilities;

DETAILED DESCRIPTION OF THE PREFERRED EMBODIMENT

Figure 1:
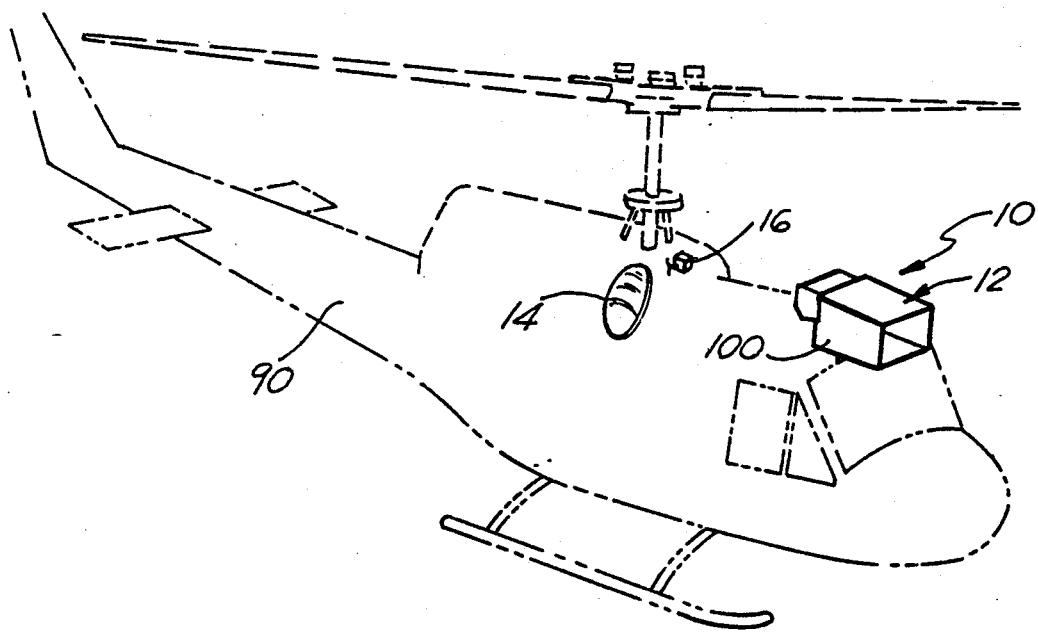
FIG. 1 is a perspective view of a single rotor type helicopter showing the typical mounting of the preferred embodiment of the system of the present invention.

Referring now to the drawing, and in particular FIGS. 1–8, the helicopter icing spray system of the present invention is designated generally by the numeral 10. System 10 is generally comprised of spray rake or rig 12, best seen in FIGS. 1 and 2, which comprises a rectangular housing or shroud or shell 100 open at the front and rear to allow and control ambient air flow therethrough (ARROW A). Within shroud 100 is a piping and nozzle arrangement or distribution tree 95, best seen in FIGS. 6a and 6b, and discussed further hereinbelow.

Figure 2:
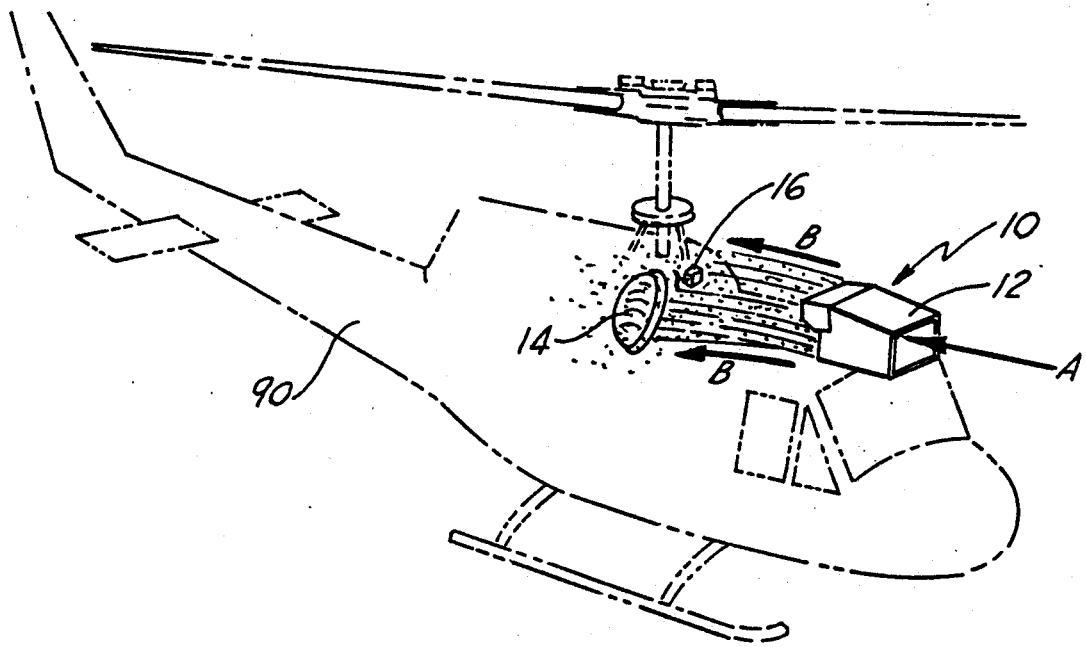
FIG. 2 is a perspective view of a single rotor type helicopter showing the typical mounting of the embodiment of FIG. 1 during test conditions.

FIGS. 2 and 3b depict the helicopter air induction inlet application of the system 10 of the present invention. Spray rig 12 is mounted on helicopter 90 forward of the engine inlet screen 14, as best seen in FIGS. 1, 2, 3a and 3b (approximately six and one-half (6½') feet in the preferred embodiment). Ice detector 16 extends into the stream tube normally ingested into the engine. A length of ¼" diameter round bar 17 is mounted in the stream to be immediately downstream of ice detector 16 and is interrupted by the test item (engine inlet) to collect ice and check the type, amount and shape of the ice formed. This bar 17 also serves as a mount for a thermocouple 18 used to measure ambient temperature. Inlet screen 14 (outer), preferably of perforated metal, acts as an automatic valve which closes by freezing over as soon as icing conditions occur. This then forces the air flow through alternate air passage or by-pass gap 19. Inner screen 20 is provided to act as a foreign object screen. A pitot static tube 24 just upstream of the engine bell mouth 26 gives a relative indication of inlet losses (the preferred engine is an Allison 250-C30G gas turbine, two of which (port and starboard) are normally installed in a Bell Model 222 helicopter).

Figure 5:
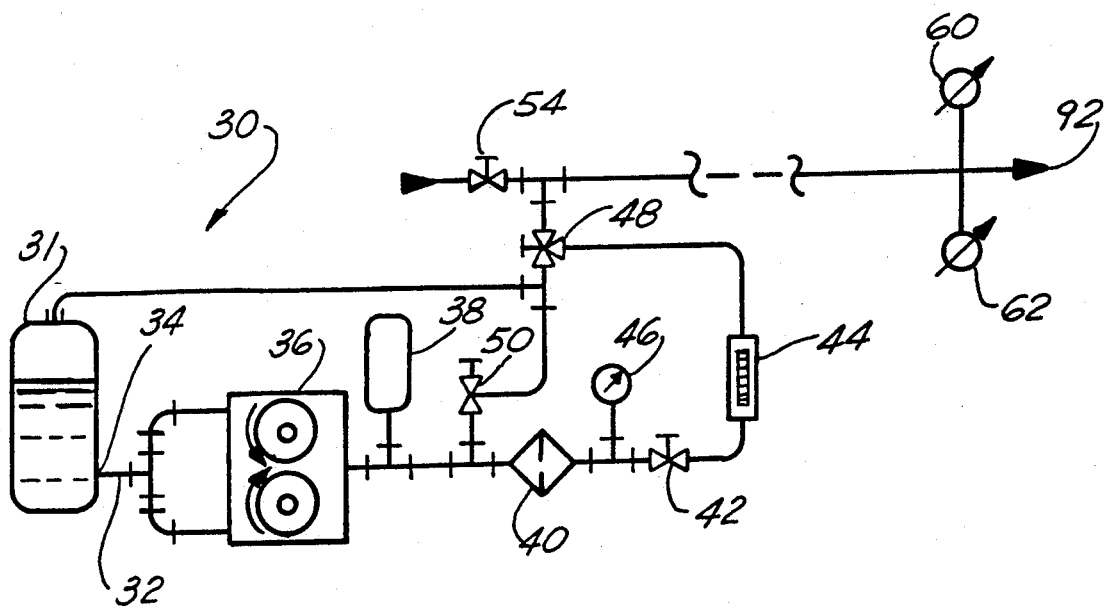
FIG. 5 is a schematic of the airborne water supply system.

The test equipment is best seen in FIGS. 4–8. The water system 30 is best seen in FIG. 5. Water is stored in a thirty (30) gallon heated water tank 31. Large diameter piping 32 connects the tank's outlet 34 to a double acting variable displacement pump 36 which is used to provide water to spray rig 12 (at water inlets 92 of distribution tree 95) at pre-set pressure and flow rate. Pressure pulses are smoothed out to less than one-half (½%) percent by a special accumulator 38. A filter 40 is provided to assure a sediment free water supply. In conjunction with the pump displacement controls, needle valve 42 is used to set water pressure and flow rate measured by flow meter 44 and pressure gauge 46. Three-way valve 48 allows the water to be directed either toward the spray distribution tree 95 or back into the water tank 31 allowing the water supply to be pre-regulated. Pressure relief valve 50 protects the equipment against operator error in manipulating needle valve 42 and freeze up of rake 12. Gate valve 54 connects the hot bleed air line to the external water lines and the spray rig 12. It is left in a partially "on" position if the system is not operated to prevent freeze up. Temperature and pressure sensors 60, 62 are mounted at the base of the spray rig 12.

Figure 4:
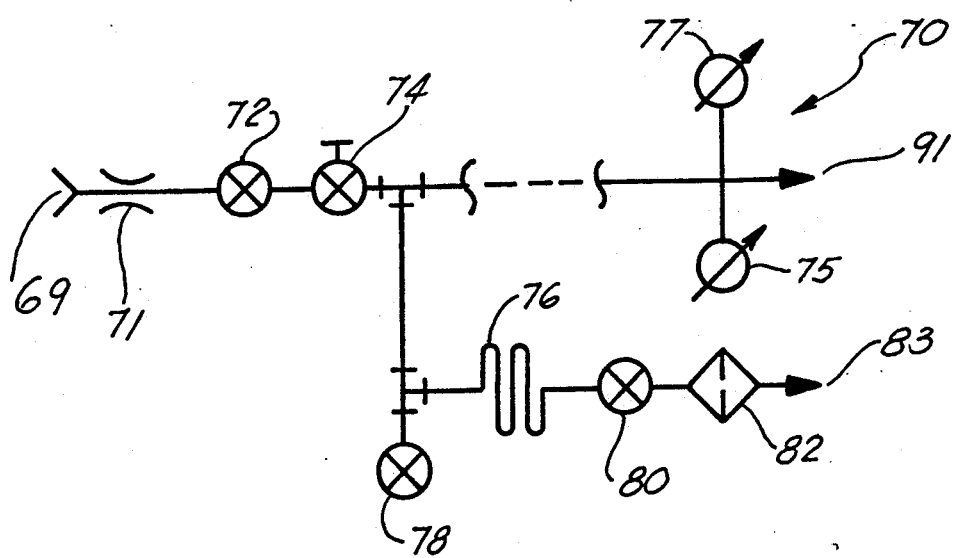
FIG. 4 is a schematic of the airborne air supply system.
Figure 6A:
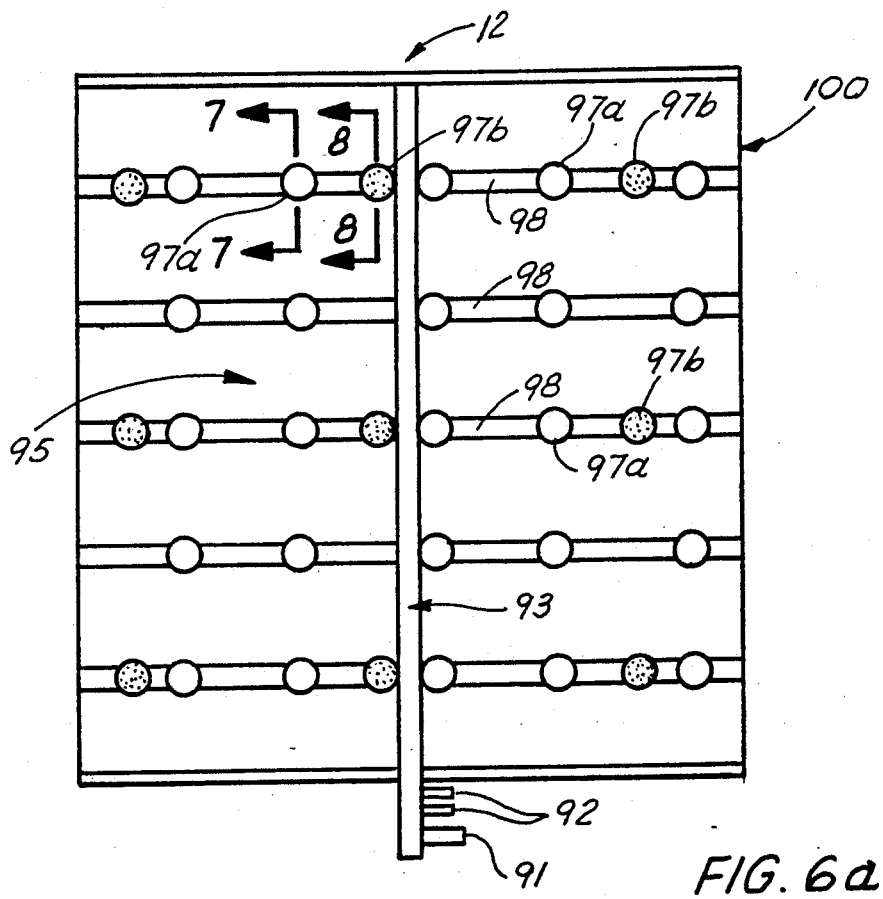
FIGS. 6a and 6b are schematics of the spray rake configuration.
Figure 6B:
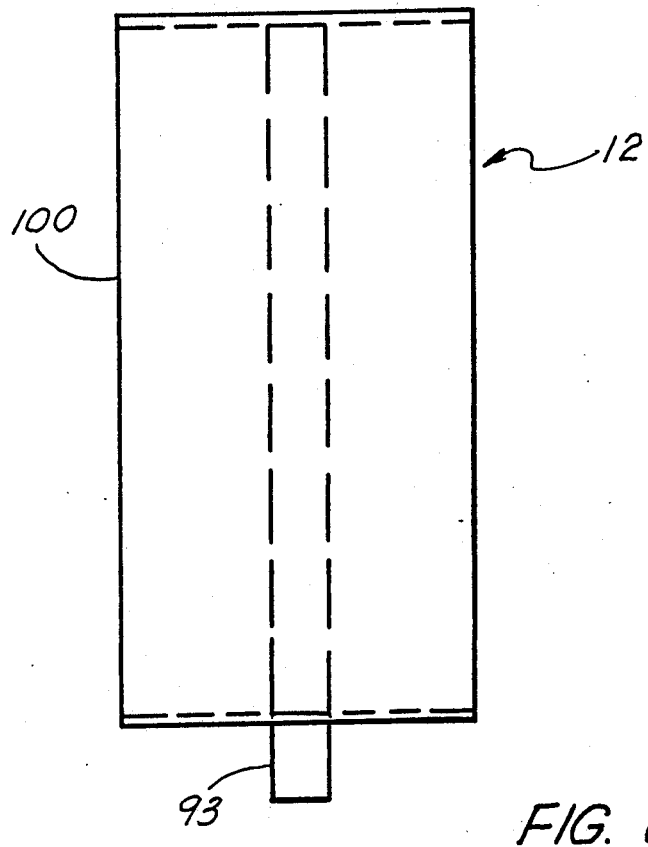
Figure 7:
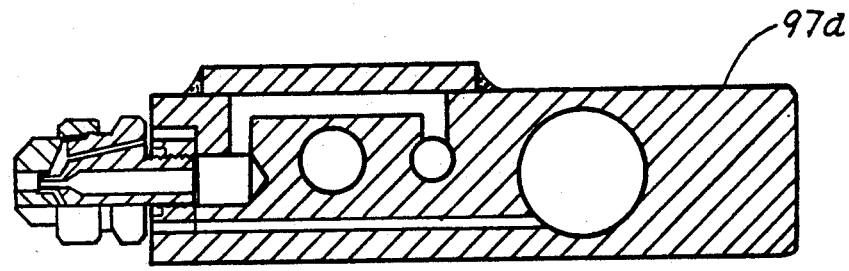
Figure 8:
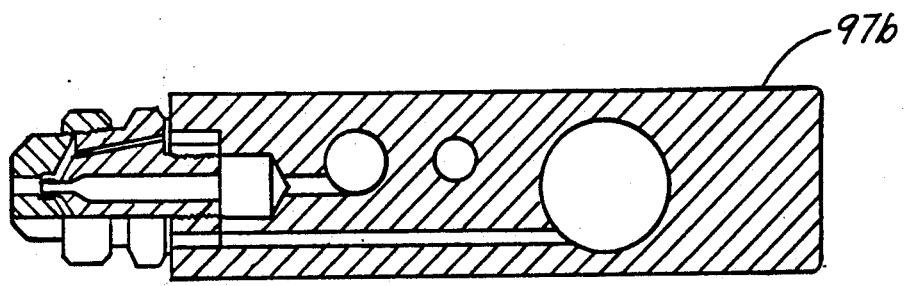
Figure 10:
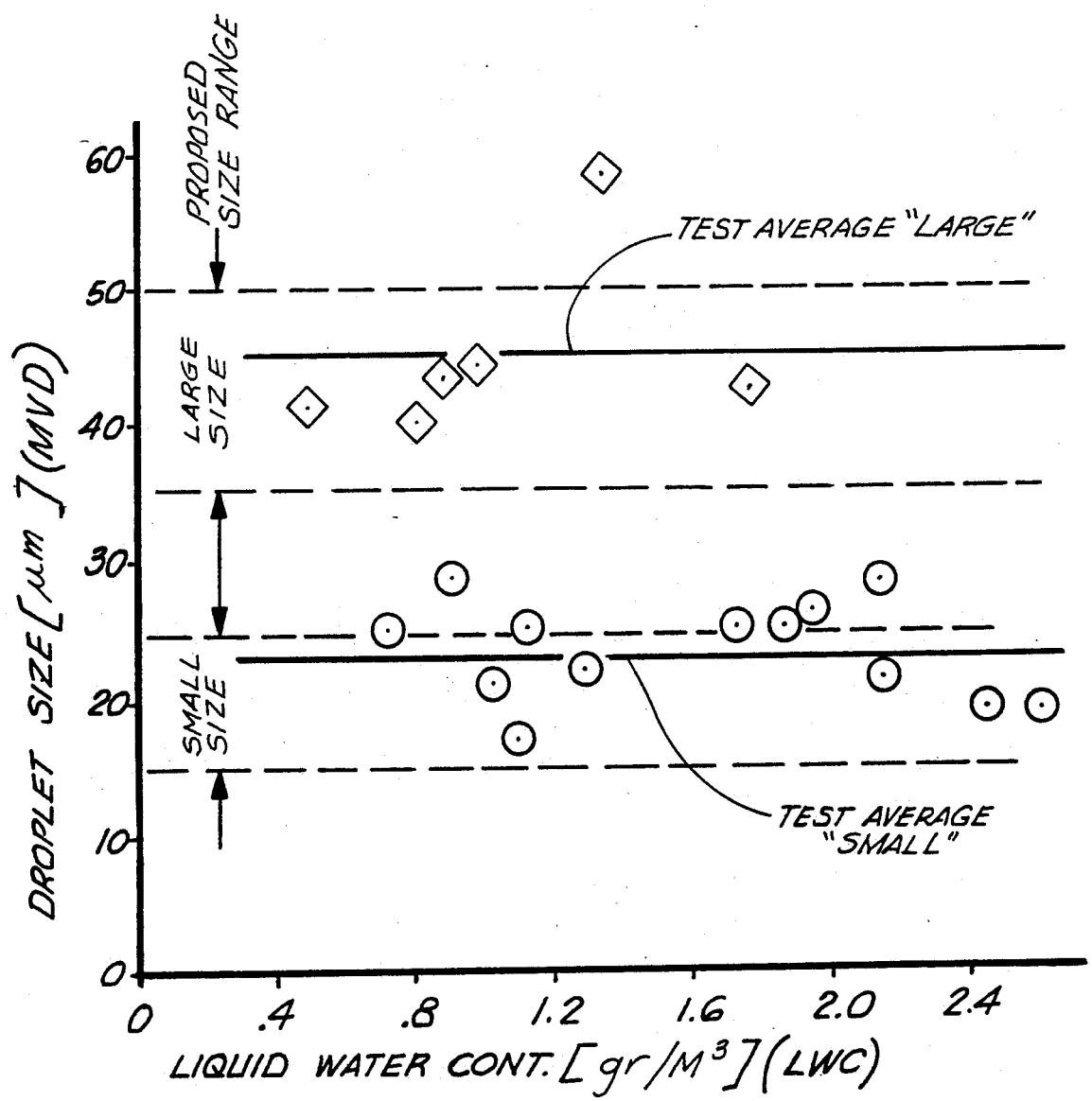
FIG. 10 is a graph of the rake's performance.
Figure 11:
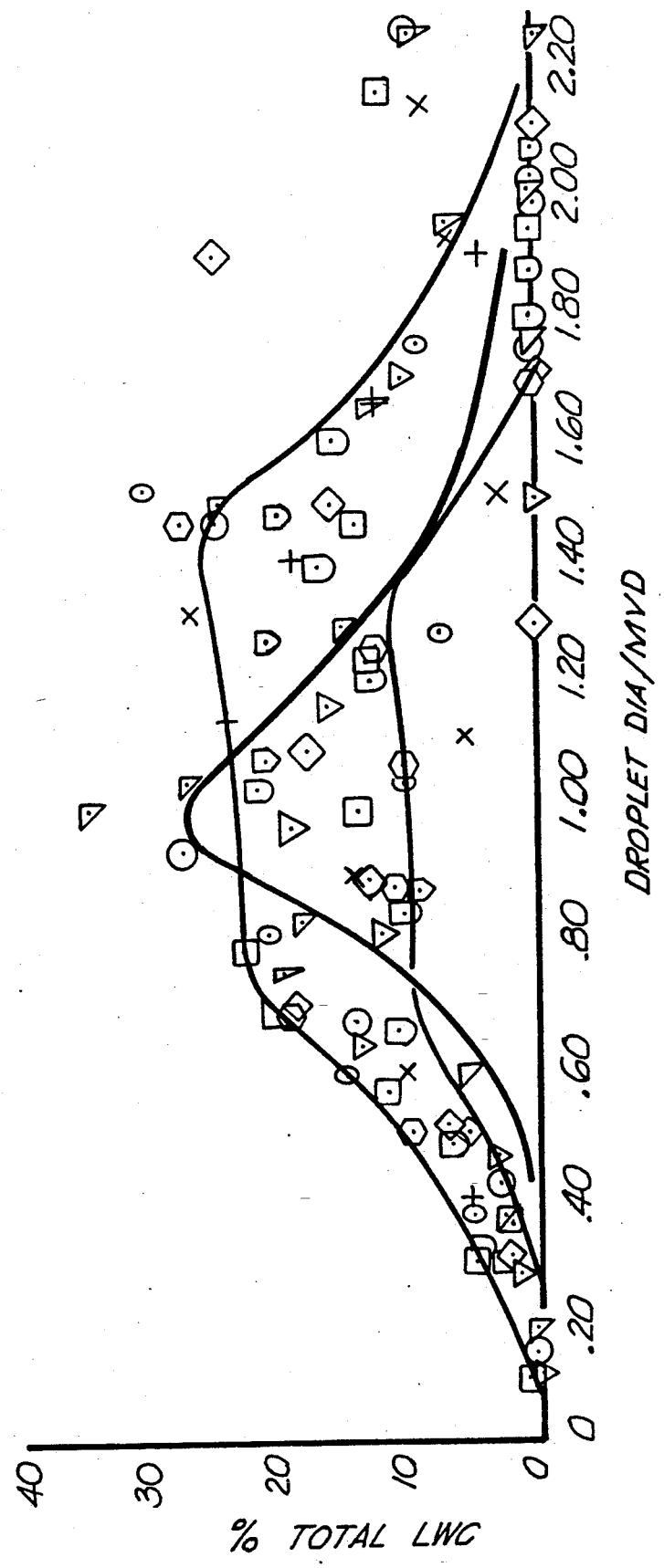
FIG. 11 is a graph of the droplet size distribution.

The air system 70 is best seen in FIG. 4. Air is supplied from the engines, in this case the port engine 69. Bleed air orifice 71 (0.435 inch diameter in the preferred embodiment) protects the engines from excessive bleed air drains. Bleed air valve or shut-off 72 is pilot operated to assure take off power. Bleed air control or gate valve 74 is controlled by the equipment operator. Thermocouple and pressure pickup 75, 77, respectively provide guidance to the spray rig 12 operator to set the appropriate air supply pressure and flow rate to spray nozzle air inlet 91. Cooling coil 76 and water trap 78, valve 80 and pre-filter 82 are provided to power the freezable liquid water content (LWC) meter 83 mounted ahead or upstream of the item (engine) to be tested.

The water and air supply systems can be calibrated such that the super cooled liquid water content (LWC) as well as the droplet size (MVD) can be pre-selected.

FIGS. 6*a* and 6*b* show the actual spray rake 12 which is mounted on aircraft 90 ahead (upstream) of the item (engine) to be subjected to a icing cloud (seen in the photograph). Air and water are fed into air inlet 91 and water inlets 92*a*, 92*b* mounted in the bottom of vertical piping 93 of distribution tree 95. To assure a homogeneous icing cloud, the fluid and air passages are proportioned for approximate equal pressure drops for the design conditions. Nozzles 97*a*, 97*b* are mounted on each of five (5) pairs of centrally fed lateral arms 98 communicating with vertical piping 93. The adjustable shroud 100, best seen in FIG. 6B acts as a flow straightener properly positioning the ice cloud on the target (see photograph).

FIGS. 7 and 8 show cross-sections of the distribution arms at the locations shown in FIG. 6*a*. The internal plumbing is such that it is possible to operate nozzle spray array 97 separately or together such that well proportioned icing clouds having a wide range of LWCs can be obtained. Furthermore, this arrangement allows the nozzle array 97 to be operated using nozzles 97 as "misting" nozzles controlling the relative humidity in the icing cloud. This is particularly important if very small droplet sizes are desirable because this allows control of the evaporation rate.

Results from a Bell Model 222 C30 testing (FIGS. 9 and 10) show that the design objectives have been met. Test results show that natural icing conditions can be simulated (FIGS. 9–11). This is achieved by the ability to pre-set droplet size (MVD) and freezable liquid water content (LWC) using the plumbing arrangement shown in FIGS. 5–6; by combining air and water passages into a compact distribution system, nozzle freeze-ups have been eliminated; although relative humidity measurements have not been made, RH control is considered to be a significant capability of this arrangement; and, multiple nozzle group operators allow for an entire icing spectrum coverage.

By adding an externally mounted bleed air cooler, this rig is also capable of producing artificial "snow."

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense. As an example, this system can apply to types of aircraft other than rotary wing.

What is claimed as invention is:

1. A system for testing the icing condition of aircraft engines during flight, said system being self-contained on said aircraft and comprising:
   - (a) a source of air under pressure bled off from said engine;
   - (b) a source of liquid under pressure; and,
   - (c) means mounted externally to said aircraft and forward of its said engine and engine air inlet and connected to said sources of air and liquid for spraying a mixture of said air and liquid toward said engine air inlet, said means for spraying comprising:
     - (i) an adjustable outer housing having a passageway therethrough for directing ambient air flow therethrough and toward said engine air inlet;
     - (ii) a distribution means positioned in said housing, said distribution means being in fluid communication with said sources of air and liquid; and,
     - (iii) a plurality of spray nozzles provided in said distribution means.

2. The system of claim 1, further comprising means for detecting icing build-up, said means being positioned intermediate said means for spraying and said engine air inlet.

3. The of claim 2, further comprising means for accumulating ice, said means being positioned intermediate said icing detecting means and said engine air inlet.

4. The system of claim 1, wherein said source of liquid under pressure is a liquid container and pump, said pump positioned in a fluid flow line intermediate said container and said spray nozzles, said pump having means for selective activation and deactivation.

5. The system of claim 1, and further comprising means for preventing the freezing of said liquid under pressure.

6. The system of claim 1, and further comprising means for controlling said mixture of said air and liquid to be sprayed from said spray nozzles toward said engine air inlet.

7. The system of claim 1, wherein said liquid is water.

8. A system for testing the icing conditions of aircraft engines during flight, said system being self-contained on said aircraft and comprising:
   (a) a source of air under pressure bled off from said engine;
   (b) a source of liquid under pressure;
   (c) means mounted externally to said aircraft and forward of its said engine and engine air inlet and connected to said sources of air and liquid for spraying a mixture of said air and liquid toward said engine air inlet, said means for spraying comprising:
      (i) an adjustable outer housing having a passageway therethrough for directing ambient air flow therethrough and toward said engine air inlet;
      (ii) a distribution means positioned in said housing, said distribution means being in fluid communication with said sources of air and liquid; and,
      (iii) a plurality of spray nozzles provided in said distribution means;
   (d) means for detecting icing build-up positioned intermediate said means for spraying and said engine air inlet; and,
   (e) means for controlling said mixture of said air and liquid to be sprayed from said spray nozzles toward said engine air inlet.

9. The system of claim 8, and further comprising means for accumulating ice positioned intermediate said icing detecting means and said engine air inlet.

10. The system of claim 8, and further comprising means for preventing the freezing of said liquid under pressure.

11. The system of claim 8, wherein said source of liquid under pressure is a liquid container and pump, said pump positioned in a fluid flow line intermediate said container and said spray nozzles, said pump having means for selective activation and deactivation.

12. The system of claim 8, wherein said liquid is water.

13. A system for testing the icing conditions of aircraft engines during flight, said system being self-contained on said aircraft and comprising:
   (a) a source of air under pressure, said source being air bled off from said aircraft engine;
   (b) a source of liquid under pressure, wherein said source is a liquid container and pump, said pump having means for selective activation and deactivation;
   (c) means mounted externally to said aircraft and forward of its said engine and engine air inlet and connected to said sources of air and liquid for spraying a mixture of said air and liquid toward said engine air inlet, said means for spraying comprising:
      (i) an adjustable outer housing having a passageway therethrough for directing ambient air flow therethrough and toward said engine air inlet;
      (ii) a distribution means positioned in said housing, said distribution means being in fluid communication with said sources of air and liquid; and,
      (iii) a plurality of spray nozzles provided in said distribution means;
   (d) means for detecting icing build-up positioned intermediate said means for spraying and said engine air inlet;
   (e) means for accumulating ice positioned intermediate said icing detecting means and said engine air inlet;
   (f) means for preventing the freezing of said liquid under pressure; and,
   (g) means for controlling said mixture of said air and liquid to be sprayed from said spray nozzles toward said engine air inlet.

14. The system of claim 13, wherein said liquid is water.

15. The system of claim 13, wherein said housing is substantially rectangular in shape and open at its front and rear to form said passageway.

* * * * *